Nov. 27, 1923.
B. H. SAUNDERS
1,475,449
VARIABLE SPEED DRIVE GEAR
Filed Dec. 6, 1921
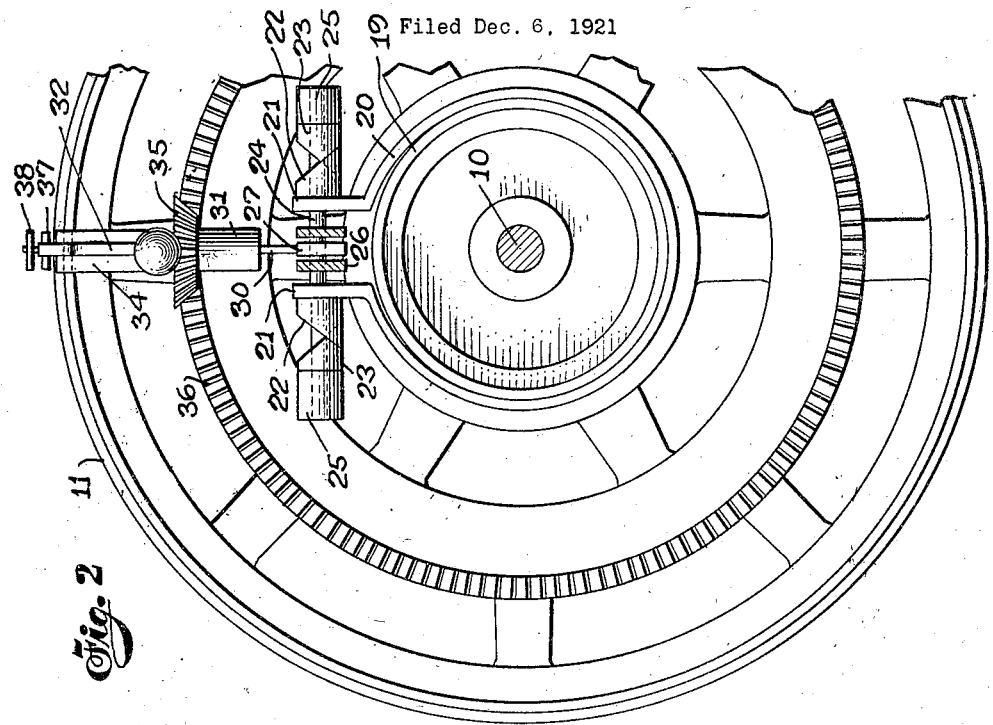
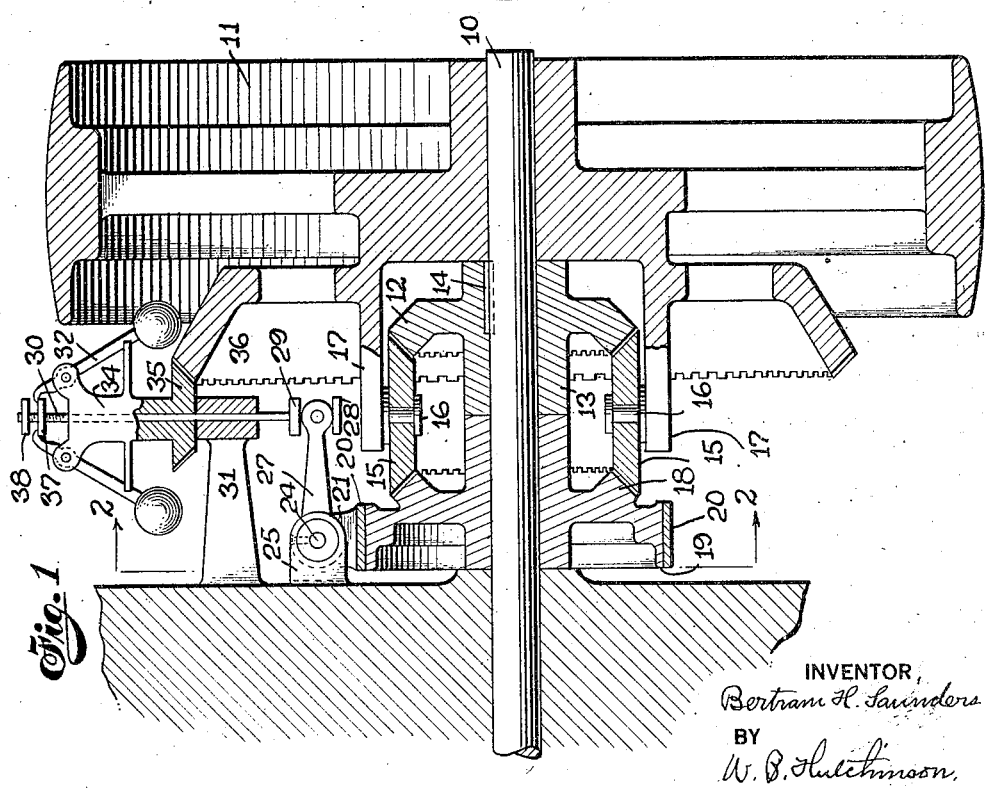
INVENTOR,
Bertram H. Saunders.
BY
W. B. Hutchinson,
ATTORNEY Patented Nov. 27, 1923.

1,475,449

UNITED STATES PATENT OFFICE.

BERTRAM H. SAUNDERS, OF PATERSON, NEW JERSEY.

VARIABLE-SPEED DRIVE GEAR.

Application filed December 6, 1921. Serial No. 520,280.

*To all whom it may concern:*

Be it known that I, BERTRAM H. SAUNDERS, a citizen of the United States, and a resident of Paterson, Passaic County, New Jersey, have invented a new and useful Improvement in Variable-Speed Drive Gears, of which the following is a full, clear, and exact description.

My invention relates to improvements in variable speed driving gears. In textile and other industries there are many machines which must be driven at a substantially constant speed, in order to work efficiently and to ensure a proper output of the machines. Difficulty has been had in providing driving apparatus which would maintain a desired speed with sufficient constancy. The object of my invention is to obviate this difficulty, and produce a comparatively simple and efficient driving gear which will work at a comparatively constant speed, and which has means to automatically reduce the speed in case it gets too high, and to regulate the speed with substantial nicety. In consonance with this idea I provide in connection with the gear, a governor which can be of any usual or approved type, and which will actuate mechanism to change the speed of the driving gear according to the speed of the governor. This change of speed may be effected in a number of ways, and I have shown a simple and efficient means of carrying out my idea without, however, limiting the invention to the details shown. This will be better understood from the description which follows.

Reference is to be had to the accompanying drawings forming a part of this specification, in which similar reference characters indicate corresponding parts in all the views.

Figure 1 is a broken cross section of the driving gear embodying my invention, parts being shown in elevation, and Figure 2 is a broken section on the line 2—2 of Figure 1.

By way of example I have shown my driving gear provided with a driving shaft 10 having a main drive member 11 thereon, which as illustrated is a belt pulley, but which obviously might be other means of transmission, as for instance, a gear or friction drive. This member 11 is loose on the shaft 10. At the side of the member 11, and preferably in close contact therewith, is a bevel gear 12, the hub 13 of which is keyed or otherwise fastened, as shown at 14 in Figure 1, to the shaft 10. This gear 12 meshes with a pair of diametrically opposed pinions 15 which are beveled, and the axes of which are at right angles to the shaft 10. The pinions 15 are pivoted on studs 16 which are supported on bracket arms 17 rigid on the member 11. This arrangement it will be seen in connection with the gear 18 presently referred to, forms a planetary drive, and obviously there might be one of these pinions, but two makes a better balanced and stronger arrangement. The pinions 15 mesh with a bevel gear 18 which is also loose on the shaft 10, and which has a flat face 19 adapted to be engaged by a brake band 20. This band can be operated in any approved way, but I have shown a rather conventional form of brake band having turned up ends 21, which are provided with cam members 22 adapted to be engaged by opposed cam members 23 on the shaft 24, which rotates in bracket arms 25 affixed to a stationary adjacent abutment, and also in supporting members 26. Obviously as the shaft 24 turns, the cam members 23 which normally press the members 22 to lock the brake will permit the flanges 21 to separate, and the brake band to become loose on the surface 19. As stated, this braking arrangement is rather conventional, is not claimed, and the invention on the other hand is not limited to any such arrangement.

The shaft 24 is provided with a crank arm 27 which loosely engages between the collars 28 and 29 on the governor rod 30 which slides in a stationary support 31 above the lever or crank 27. The governor shown is also a conventional type and is not claimed in detail, and on the other hand any suitable governor can be used. The kind illustrated has pivoted weighted arms 32 which are carried by the body 34, and this has a bevel pinion 35 meshing with and driven by a gear wheel 36 which is fixed to the member 11 as shown clearly in Figure 1. The upper ends of the weighted arms 32 engage as usual between the collars 37 and 38 on the governor shaft 30, and it will be understood that the governor has the usual or any preferred means of regulating the tension under which the arms 32 work. This is not shown in detail because it is common to all governors, and is not claimed.

It will be seen that the governor is driven directly from the member 11, and the movement of the weighted arms 32 is therefore controlled entirely by the speed of the member 11 from which power is taken.

When the machine is normal and the shaft 10 rotates, the gear 12 will impart its motion to the pinions 15, and these engaging the teeth of the gear 18 which normally is locked by the brake band 20, will impart motion to the pulley 11. When, however, the speed increases to a certain extent, the weighted arms 32 of the governor will fly out, thus moving down the rod or shaft 30, tilting the crank arm 27, and loosening the brake band 20. The consequent slipping of the gear wheel 18 will therefore slow down the pulley 11, and the speed of the gear 12 and pinions 15 will in part be taken up by the movement of the gear 18, and partly by the movement of the pulley 11, thus lessening the speed of the latter. It will be seen, therefore, that the governor as it increases in speed will tend to check the speed of the driving member 11, and as the speed of the governor lessens, the tension of the brake will be applied, thus allowing the shaft 11 to increase to normal speed.

It will be seen, therefore, that the important thing is to have the member 11 driven from the parts 12 and 15, but to have these latter parts or pinions engage a member, as 18, which is locked or released by the action of the governor controlled by the member 11. The details of construction which include the governor, the connection between the governor and the member 11, and the means controlled by the governor for checking the member 18, can obviously be varied to a great extent without affecting the invention.

Attention is called to the fact that the machine operator can by regulating the tension of the governor, absolutely control the speed at which the main driving member 11 shall transmit power to another machine element, that is to say, by varying the tension of the governor, he can make it operate at a greater or less speed of the member 11, and so place the transmitted speed within easy and perfect control.

I claim:—

1. A differential driving gear comprising a shaft, a main driving member loose on the shaft, a gear tight on the shaft, a second gear loose on the shaft, a planetary driving connection supported in part by the main driving member between the two gears, a governor driven by the main driving member, and means actuated by the governor for controlling the speed of the second gear.

2. A variable speed driving gear comprising a shaft, a main drive member loose on the shaft, a gear tight on the shaft, a second gear loose on the shaft, connecting pinions carried by the main drive gear and meshing with the said first and second gears, a governor driven by the main drive member, and means actuated from the governor for controlling the said second gear.

3. A variable speed drive gear comprising a shaft, a main drive member loose on the shaft, a gear fast to the shaft, a second gear loose on the shaft, a driving connection between the two gears, said driving connection being carried by the drive member, and means actuated by the increase of speed of the main drive member for releasing the second gear.

4. A variable speed drive gear comprising a shaft, a main drive member loose on the shaft, a gear fast on the shaft, a second gear loose on the shaft, a planetary drive carried by the main drive member and connecting the first and second gears, a governor driven from the main drive member, and a brake mechanism actuated by the governor and connected with the second gear.

5. A variable speed drive gear comprising a shaft, a main drive member loose on the shaft, a second member fast to the shaft, a governor driven by the main drive member, and an operative driving connection controlled by the governor supported in part by the main drive member and connecting the main drive member to the second member which is fast on the shaft.

6. A variable speed driving gear comprising a shaft, a main drive member loose on the shaft, a second member fast to the shaft, a governor driven by the main drive member, an operative driving connection controlled by the governor and connecting the main drive member to the second member which is fast on the shaft, and means for regulating the speed at which the governor operates to control said driving connection, thereby regulating the speed of the main drive member.

BERTRAM H. SAUNDERS.

Witnesses:
WARREN B. HUTCHINSON,
M. G. O'DONNELL.